US007001631B2

(12) United States Patent
Mielnik et al.

(10) Patent No.: US 7,001,631 B2
(45) Date of Patent: Feb. 21, 2006

(54) LOW TEMPERATURE SANITIZATION OF HUMAN PATHOGENS FROM THE SURFACES OF FOOD AND FOOD PACKAGING

(75) Inventors: Thaddeus J. Mielnik, Concord, OH (US); Matthew C. Lawes, Shaker heights, OH (US); Gerald E. McDonnell, Chardon, OH (US)

(73) Assignee: Steris Inc., Temecula, CA (US)

( * ) Notice: Subject to any disclaimer, the term of this patent is extended or adjusted under 35 U.S.C. 154(b) by 365 days.

(21) Appl. No.: 10/208,490

(22) Filed: Jul. 30, 2002

(65) Prior Publication Data

US 2004/0022907 A1    Feb. 5, 2004

(51) Int. Cl.
    A23B 9/16        (2006.01)
(52) U.S. Cl. ............... 426/316; 426/320; 426/326; 426/335; 426/399; 426/482; 422/28; 422/32; 422/33; 99/472; 99/477
(58) Field of Classification Search ............... 426/287, 426/288, 312, 316, 320, 324–326, 335, 632, 426/399, 401, 407, 482, 521; 422/28, 33, 422/32; 99/467, 472, 477
    See application file for complete search history.

(56) References Cited

U.S. PATENT DOCUMENTS

| 3,891,779 A | * | 6/1975 | Robinson | ............... 426/399 |
| 4,992,247 A | * | 2/1991 | Foti | ............... 422/304 |
| 5,258,162 A | * | 11/1993 | Andersson et al. | ............... 422/28 |
| 5,460,845 A | | 10/1995 | Dalmasso | ............... 426/320 |
| 5,535,667 A | | 7/1996 | Dalmasso et al. | ............... 99/472 |
| 6,245,294 B1 | * | 6/2001 | Goldberg et al. | ............... 422/26 |
| 6,265,006 B1 | * | 7/2001 | Inglis et al. | ............... 426/320 |
| 6,413,481 B1 | * | 7/2002 | Pennekamp et al. | ............... 422/302 |
| 6,485,769 B1 | * | 11/2002 | Audy et al. | ............... 426/320 |
| 6,682,697 B1 | * | 1/2004 | He et al. | ............... 422/29 |

FOREIGN PATENT DOCUMENTS

JP          11332751 A     * 12/1999
WO          WO 94/04036        3/1994

OTHER PUBLICATIONS

Health Hazard Alert—"Mixed Snack Products Containing Almonds Sold By Bulk Barn May Contain Dangerous Bacteria", Apr. 18, 2001 http://www.inspection.gc.ca/english/corpaffr/recarapp/2001/20010418e.shtml.
Safety Alerts—"Hughson Nut Almonds From California Recall Update", Dec. 12, 2001 http://209.58.136.120/recall/f/014/f45512.htm.

* cited by examiner

*Primary Examiner*—Drew Becker
(74) *Attorney, Agent, or Firm*—Fay, Sharpe, Fagan, Minnich & McKee, LLP

(57) ABSTRACT

Almonds are often harvested off the ground from around trees which have been fertilized with manure. Potentially hazardous microbes are transferred from the husk to the shells during the dehusking process. During deshelling, shell dust with attached microbes escapes into the atmosphere and can permeate an entire packaging facility, contaminating previously uncontaminated packaging and food products. A sterile barrier is provided around the packaging facility. As the almonds in the shell are passed through the barrier, their shells are sanitized. After the nutmeats are removed from the shells, the nutmeats are sanitized again and packaged in packaging which has been sanitized.

24 Claims, 4 Drawing Sheets

LOW TEMPERATURE SANITIZATION OF HUMAN PATHOGENS FROM THE SURFACES OF FOOD AND FOOD PACKAGING

BACKGROUND OF THE INVENTION

The present invention relates to the killing of microorganisms on food items, without degrading the food items. The invention finds particular application in conjunction with almonds and will be described with particular reference thereto. However, it is to be appreciated, the invention will also find application in conjunction with other types of nuts, seeds, dehydrated fruits, and other agricultural products.

To promote the growth of agricultural products, fertilizer is typically added to the soil. Manure, a commonly used fertilizer, can carry human pathogens, such as *Salmonella, E-coli,* and *Listeria.* When food items come into contact with the soil during harvesting, or with equipment that has contacted the soil, the food items can pick up the human pathogens on their surface. As the harvested food items are gathered together, the pathogens can be passed from surface to surface by direct contact.

When harvesting almonds, for example, it is common to shake the trees dropping the almonds (in their shells and husks) to the ground. The almonds are then collected from the ground. In a first operation, the husks are removed from the almonds, leaving the almonds in their shells. Some almonds are sold in their shells, and others are deshelled prior to packaging. The removed husks would be expected to be the carriers of any human pathogens picked up from the soil. Even after husking, the shell provides a pathogen impermeable package for the nutmeat. Conventional, mechanical shelling operations raise a significant amount of dust, sending dust-sized portions of the shell and any pathogens which might be thereon airborne.

Subsequently, the shelled nutmeats undergo various sorting operations. Some of the nutmeats are cooked, which would also be expected to kill any surface pathogens. Other nutmeats are packaged and sold raw. Although the chances of human pathogens being present on the packaged nutmeats might appear relatively remote, there have been recent recalls of almonds for *Salmonella* contamination.

One solution to the contamination problem is found in the present assignee's U.S. Pat. Nos. 5,460,845 and 5,535,667. These patents describe a batch process in which almonds and other food items are exposed to hydrogen peroxide vapor in a vacuum chamber for periods of about a half hour to one hour. These patents also describe limited kill rates at somewhat shorter periods of exposure at atmospheric pressure.

Although effective, such batch processing techniques are not readily compatible with modern processing plants in which each processing line processes about 10,000 kilograms of food product per hour or more.

The present invention overcomes the above-referenced problems and others.

SUMMARY OF THE INVENTION

In accordance with one aspect of the present invention, a method of sanitizing human pathogens from surfaces of agricultural food products is provided. The food products are moved continuously on a mesh belt. While the food products are moving along the belt, they are treated with a gaseous oxidizing agent at atmospheric pressure for a sufficient duration to kill human pathogens.

In accordance with another aspect of the present invention, an apparatus for sanitizing human pathogens from surfaces of agricultural food products is provided. A mesh belt continuously conveys the food products into, through, and out of a food chamber. A means is provided for supplying a gaseous oxidizing agent at atmospheric pressure to the chamber to treat the food products, the chamber has a length relative to a speed of the mesh belt such that the food products remain in the chamber for a sufficient duration to kill human pathogens.

One advantage of the present invention resides in its speed.

Another advantage of the present invention is that it provides a flow-through sanitization system which can process food products at the same rate that they are moving along conventional processing assembly lines.

Another advantage is that the present invention kills human pathogens in 30 seconds or less.

Another advantage of the present invention is that it does not alter the taste of the food products.

Another advantage of the present invention is that it does not alter the value of almonds by changing the appearance of the brown skin or pellicle.

Still further advantages and benefits of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating preferred embodiments and are not be construed as limiting the invention.

DETAILED DESCRIPTION OF THE PREFERRED EMBODIMENTS

Figure 1:
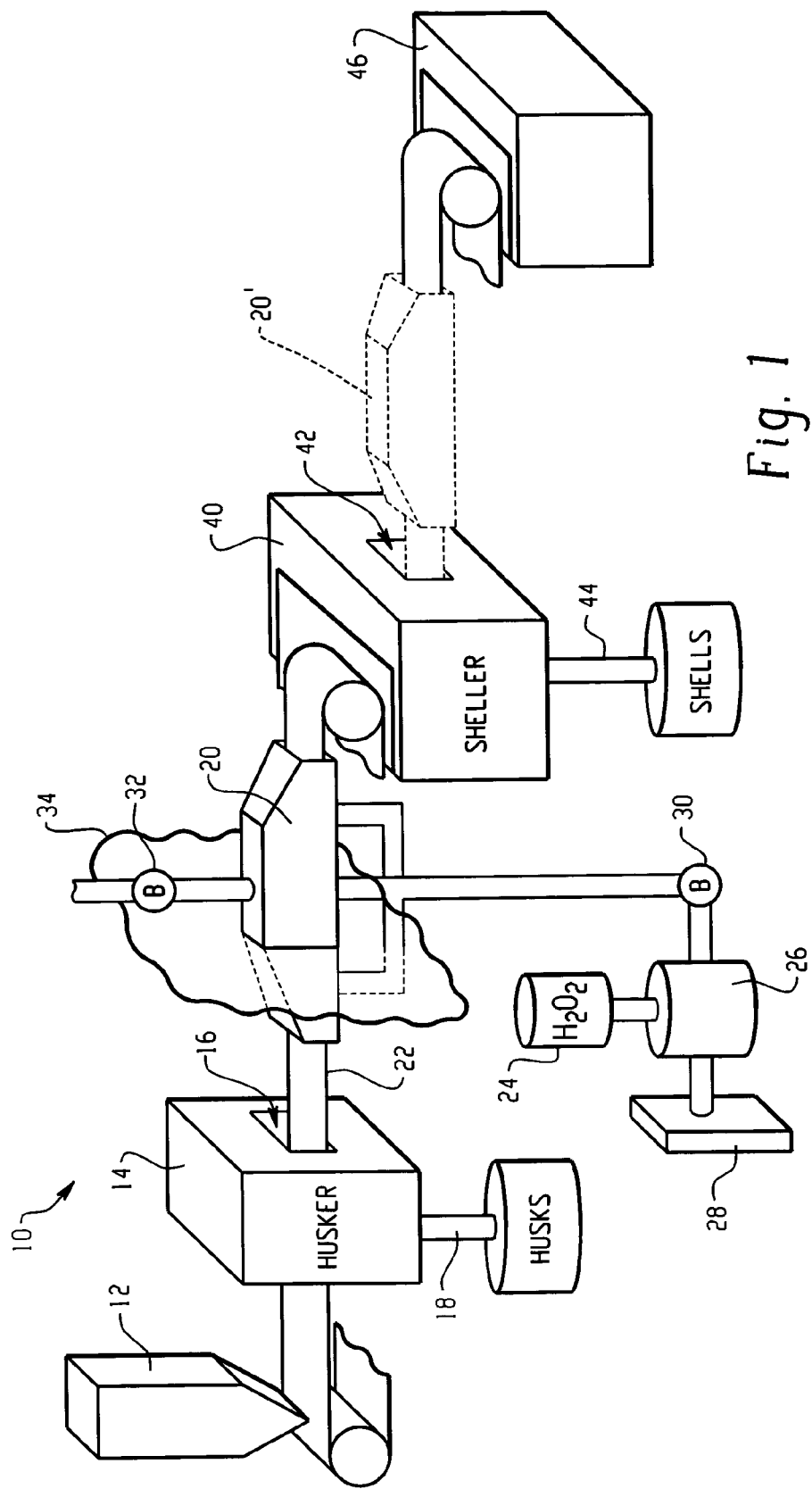
FIG. 1 is a diagrammatic illustration of a husking and shelling line in accordance with the present invention.

At harvest time, almonds or other shelled food products are received in bulk at a dehusking and deshelling facility 10. The bulk almonds are emptied into a large hopper or other supply 12 from which almonds or other foods products are supplied to a husk removing machine 14. The husk removing machine discharges almonds in the shell at one output 16 and outputs the husks through a second output 18. The husks are removed from the facility and sold for other agricultural uses, such as additives to livestock feed. The almonds in the shell from the outlet 16 are conveyed to a first sanitization chamber 20 on a mesh conveyor belt 22.

The sanitization chamber 20 exposes the almonds in the shell to a gaseous oxidizing agent such as ozone, vaporized liquid oxidants, condensed oxidants, plasma, or the like and combinations thereof. In the preferred embodiment, the gaseous oxidizing agent is in the form of hydrogen peroxide vapor in a concentration of about 1.8 milligrams per liter of air or greater. More specifically to the preferred embodiment, liquid hydrogen peroxide from a liquid hydrogen peroxide source 24 is fed to a vaporizer 26 at a controlled rate. In some cases, it is advantageous if air is dried by a dryer 28 and blown by a blower 30 into the sanitization chamber 20.

An exhaust blower 32 draws peroxide vapor and water vapor from the sanitization chamber and exhausts them to the atmosphere. The exhaust blower 32, preferably, is operated at a speed relative to the feed blower 30 such that the treatment chamber is maintained at a negative pressure relative to atmosphere so that the vapor hydrogen peroxide does not escape into the working atmosphere. Because the almonds are still in the shell and protected, the treatment chamber 20 can tumble or agitate the almonds, use a stronger concentration of the gaseous oxidizing agent, and can even use oxidizing agents which would leave a residue or adversely affect taste. Preferably, a microbe impermeable barrier wall 34 is maintained across the hulling and shelling facility 10 with one side of the wall being on the input to the treatment chamber 20 and the other side on the output. The chamber 20 has a length, relative to the conveyor belt speed, such that the almonds take 15–30 seconds to traverse the chamber.

From the sanitization chamber 20, the almonds are conveyed to a shelling machine 40 which removes the shells from the almonds. The nutmeats are discharged from a first outlet 42 and the shell fragments are discharged through a second outlet 44. optionally or alternately, a second sanitizing chamber 20' of the structure described above is disposed after the nutmeat outlet 42. A packaging machine 46 packages the shelled almonds in relatively large containers, such as 50 lb bags, drums, pallet sized containers, and the like. Preferably, the bulk containers are sealed against airborne pathogens. By sanitizing the portion of the husking and shelling facility 10 which is downstream from the barrier wall prior to the receipt of almonds and by sanitizing all of the almonds in the shell entering the area, all of the packaged nutmeats should be free of human pathogens. Because the husking and shelling operations are commonly performed only around harvest time and the packaging and production lines run year-round, the containers of shelled almonds are typically stored anywhere from a few hours until the next harvest season.

Figure 2:
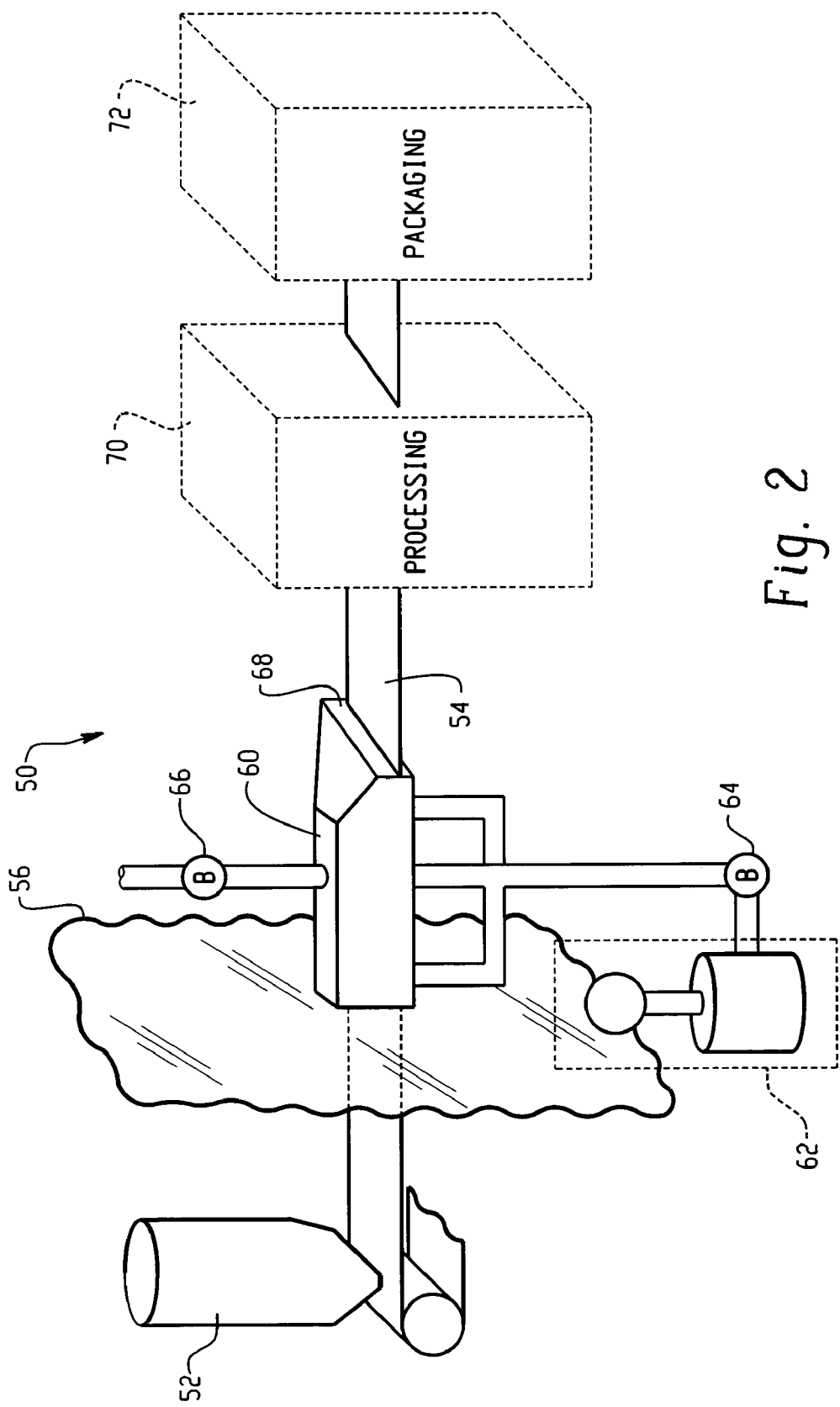
FIG. 2 is a diagrammatic illustration of a processing line for shelled nuts or other foods products in accordance with the present invention.

With reference to FIG. 2, at a packaging facility 50, the shelled nutmeats are received in a hopper 52 or other supply and fed at a controlled rate onto a mesh conveyer 54 preferably in a layer one nut thick. A barrier wall 56 surrounds the hopper 52 and isolates the area of the hopper from the remainder of the production facility.

A sanitization or treatment chamber 60 penetrates the barrier wall 56 such that its inlet receives untreated nuts on the conveyer 54 and its outlet discharges sanitized nuts or other food products on the conveyer 54 which continues downstream. The use of the barrier wall and treatment chamber 60 at the entrance to the processing facility assures that only treated nuts or food products enter the facility. This prevents cross contamination downstream. For example, nuts which are roasted go through a heating process which would normally kill the human pathogens. However, if the roasted nuts should come in contact with a contaminated, not yet roasted nut, or even a worker who had come in contact with a not yet roasted nut, human pathogens can be transferred to the previously sanitized roasted nuts. When every nut in the facility is sanitized, the chances of cross-contamination are minimized.

The treatment chamber 60, like the treatment chamber 20, includes a source 62 of a gaseous oxidizing agent, such as an ozone source, other vapor sterilant source, or a plasma source. Again, a source of liquid hydrogen peroxide of about 35% concentration and a vaporizer are preferred. A blower 64 supplies the gaseous oxidizing agent into the treatment chamber 60. The gaseous oxidizing agent, after moving among the food product, passes to an exhaust where a blower 66 exits the gas to atmosphere. Again, the relative speed of blowers 64 and 66 are preferably such that a slight negative pressure is maintained in the treatment chamber. More preferably, air curtains 68 are provided at the inlet and the outlet. The air curtains prevent the gaseous sanitizing agent from escaping from the chamber into the surrounding processing facilities and prevent contaminants from the surrounding facilities which could alter the sanitization process from entering the chamber. For example, if excess humidity from the production facility entered the treatment chamber, the water vapor could dilute the treatment gas or could alter the vapor pressure in the chamber, permitting condensation to occur.

The treatment chamber 60 has a length which is calculated such that at the normal movement speed of the conveyor belt 54, the food products dwell in the chamber for a prescribed treatment time, preferably 15–30 seconds. The flow of the gaseous oxidizing vapor through the chamber is sufficiently vigorous that the food products vibrate on the mesh conveyor belt, changing their points of contact and permitting all portions of the surface to be treated with the oxidizing vapor. Yet, the gaseous oxidizing agent flow is preferably not so vigorous that the food products are agitated to the point that they can become scarred or otherwise loose cosmetic appeal, hence value.

The sanitized almonds or other food products are passed to downstream processing equipment 70. This equipment includes sorting stations for sorting the food products by quality, e.g., broken versus unbroken nuts, nuts with whole unscarred pellicles versus nuts without, and the like. The sorted nuts are conveyed to various processing lines. For example, some pass to roasting stations where they are roasted, salting stations where salt or other spices are added, and the like as is conventional in the food processing arts. Finally, a packaging machine 72 packages metered amounts of the processed food product into appropriate consumer packages.

Figure 3:
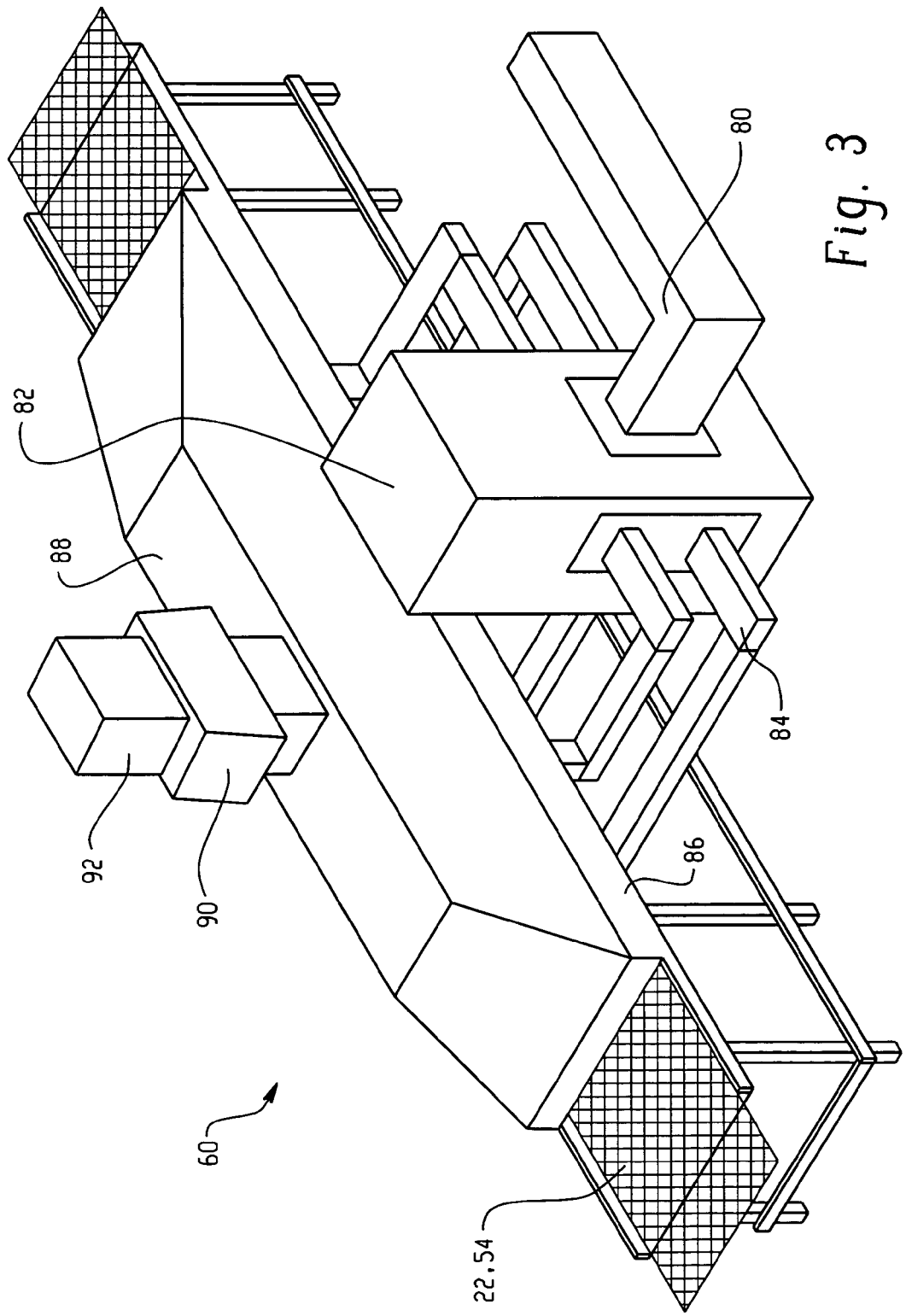
FIG. 3 is a detailed illustration of a preferred treatment chamber of FIGS. 1 and 2.

With reference to FIG. 3, the sanitizing systems 20 and 60 preferably include an inlet duct 80 which supplies air to a housing 82 which houses an appropriate dryer for the incoming air, liquid peroxide supply, vaporizer, and blower. Vapor output tubes 84 supply the generated vapor to distributed portions of a lower manifold 86. The vapor is moved upward through the mesh conveyor belt 54 into an upper manifold 88. Vapor from the upper manifold 88 is pulled by a blower through a catalytic destroyer which converts hydrogen peroxide vapor to water vapor and discharges the water vapor through a discharge duct 92.

Figure 4:
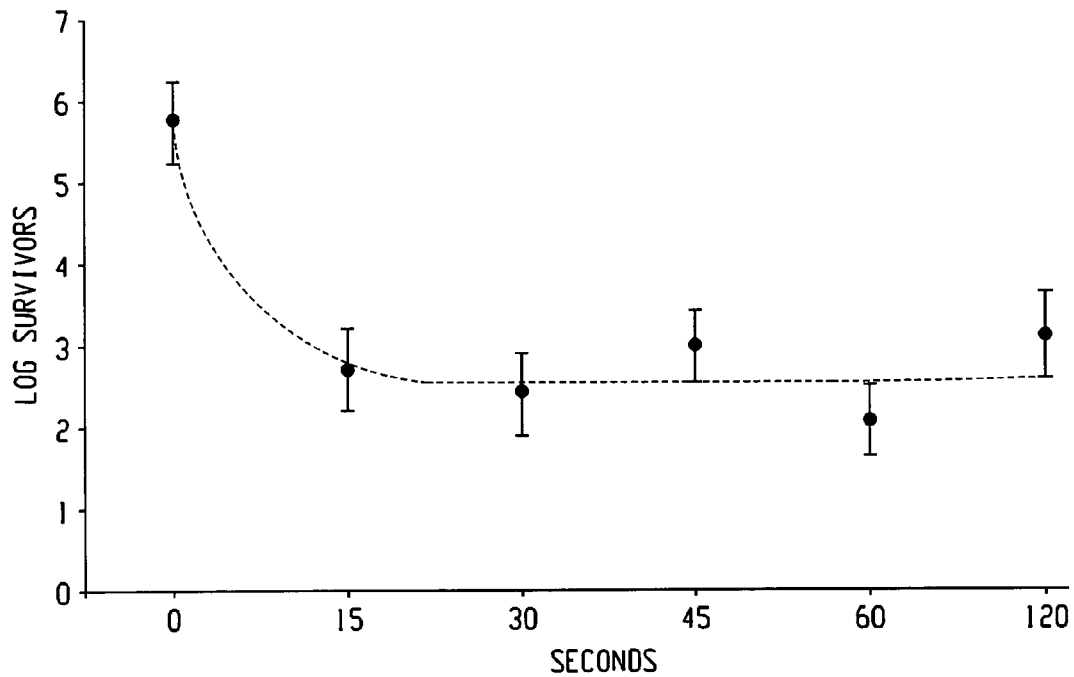
FIG. 4 illustrates bacterial concentration reduction in 15 second intervals.
Figure 5:
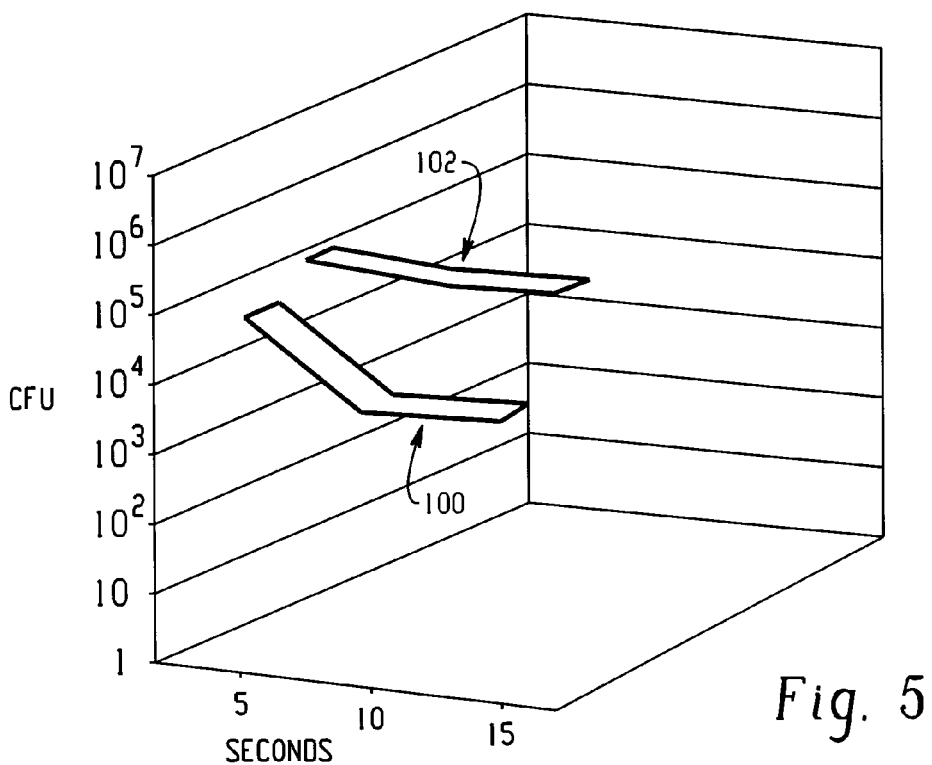
FIG. 5 illustrates bacterial concentration reduction relative to a $10^5$ control.

With reference to FIG. 4, sample almonds were inoculated with $3.7 \times 10^8$ inoculum of salmonella bacteria to achieve an initial bacterial concentration of about $10^6$. These almonds were treated with 1.8 milligram/liter concentration of hydrogen peroxide vapor at 33–34° C. FIG. 4 illustrates the log reduction at 15 second intervals. It will be seen that 15 seconds produces about a 3 log reduction. Similarly, FIG. 5 shows the relative reduction of a test sample 100 at 5 second intervals from a $10^5$ initial bacterial concentration, relative to a control 102 that was not subject to the hydrogen peroxide vapor. Again, a 3 log reduction was achieved in 15 seconds. Although tests were conducted at 5 logs, naturally infected almonds are more apt to have an initial bacterial count in the order of $10^2$–$10^3$ *Salmonella*.

The oxidizing agent treatment is preferably conducted at temperatures below 40° C. Higher temperatures tend to cause cooking of oil in the nuts and other food products, altering flavor. Hydrogen peroxide vapor is also preferred. Exposure to concentrations of 1.8 mg/liter for periods of many minutes have been shown to have no adverse organoleptic effect on the treated product. Further, hydrogen peroxide vapor does not require an aeration zone. Although 15 seconds provides sanitization of human pathogens, longer exposure times can also be used to kill spores and achieve a higher level of kill. Such higher levels of kill would improve not only safety, but also the safe shelf time for the products.

Although described with particular reference to almonds in the preferred embodiment, it is to be appreciated that similar concerns and treatment parameters are also effective on a wide variety of nuts and grains, seeds, and spices. The processes are also amenable to dehydrated and dried vegetables and fruits.

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiments, the invention is now claimed to be:

1. A method sanitizing human pathogens from surfaces of almonds, walnuts, or other nuts, the method comprising:
    removing husks from the nuts leaving nuts in their shells;
    moving the nuts in their shells continuously on a mesh belt;
    while the nuts in their shells are moving on the belt, treating the nuts in their shells with a gaseous oxidizing agent near atmospheric pressure for a sufficient duration to kill human pathogens, such that the shells are sanitized;
    after exposing the nuts in their shells to the gaseous oxidizing agent, removing the sanitized shells from the nuts leaving nutmeats;
    after removing the sanitized shells, exposing the nutmeats to a gaseous oxidizing agent for a sufficient duration to kill human pathogens on the nutmeats.

2. The method as set forth in claim 1 wherein the nutmeats are exposed to the gaseous oxidizing agent for a duration of less than 30 seconds.

3. The method as set forth in claim 2 wherein the nutmeats are exposed to the gaseous oxidizing agent for at least 15 seconds.

4. The method as set forth in claim 1 wherein the nutmeats are exposed to the gaseous oxidizing agent at a temperature below 40° C.

5. The method as set forth in claim 1 wherein the nutmeats are exposed to air concentrations of the gaseous oxidizing agent between 0.1 and 10 mg/L.

6. The method as set forth in claim 5 wherein the gaseous oxidizing agent includes hydrogen peroxide.

7. The method as set forth in claim 1 further including:
    isolating the nuts, both before and after shelling, from recontamination by airborne pathogens and from contacting pathogen bearing nuts.

8. A method of sanitizing human pathogens from surfaces of almonds, the method comprising:
    moving in-shell almonds through a microbe impermeable barrier;
    as the in-shell almonds move through the microbe impermeable barrier, killing microbes on shells of the almonds, the microbe impermeable barrier protecting the in-shell almonds that have moved through the microbe impermeable barrier from recontamination by airborne pathogens;
    after killing microbes on the shells, deshelling the almonds and separating the shells from nutmeats;
    moving the nutmeats continuously on a mesh belt;
    while the nutmeats are moving on the belt, contacting the nutmeats with a gaseous oxidizing agent near atmospheric pressure for a sufficient duration to kill human pathogens, the contacting of the nutmeats with the gaseous oxidizing agent being performed on all almond nutmeats entering a downstream production region to prevent downstream cross-contamination.

9. The method as set forth in claim 8 wherein after being treated with the gaseous oxidizing agent, at least some of the almond nutmeats are subject to a thermal processing step which raises the almond nutmeats to a sufficient temperature for a sufficient duration to effect sanitization.

10. A method of sanitizing human pathogens from surfaces of agricultural food products, the method comprising:
    moving the food products continuously on a mesh belt through a treatment chamber having an inlet through which the mesh belt carries the food products into the chamber and an outlet through which the mesh belt carries the food products out of the chamber;
    while the food products are moving through the chamber on the belt, supplying a gaseous oxidizing agent for a sufficient duration to kill human pathogens;
    exhausting the gaseous oxidizing agent from the chamber at a flow rate relative to a flow rate at which the gaseous oxidizing agent is supplied to the chamber such that a negative pressure is maintained in the chamber;
    providing a curtain of air across the chamber inlet and outlet to (a) prevent gaseous oxidizing agents from escaping to surrounding areas and (b) to prevent humidity and ambient air from entering the chamber through the inlet and outlet.

11. The method as set forth in claim 10 wherein the gaseous oxidizing agent is hydrogen peroxide entrained in air.

12. The method as set forth in claim 11 wherein the gaseous hydrogen peroxide is maintained in the chamber at a concentration of about 1.8 mg/liter.

13. The method as set forth in claim 11 wherein the chamber has a length which is commensurate with a distance that the belt travels in 15–30 seconds.

14. The method as set forth in claim 11 further including:
    dehumidifying the air in which the gaseous hydrogen peroxide is entrained prior to supplying the air to the vaporizer.

15. A method of sanitizing human pathogens from surfaces of nutmeats, the method comprising:
    moving the nutmeats continuously on a mesh belt;
    while the nutmeats are moving on the belt, treating the nutmeats with a gaseous oxidizing agent near atmospheric pressure for a sufficient duration to kill human pathogens;
    treating packaging materials with a gaseous antimicrobial agent;
    packaging the treated nutmeats in the treated packaging.

16. An apparatus for sanitizing human pathogens from surfaces of agricultural food products, the apparatus comprising:
- a mesh belt on which the food products are continuously moved;
- a chamber through which the mesh conveyor belt moves continuously, the chamber having an inlet through which the mesh belt carries the food products into the chamber and an outlet through which the mesh belt carries the food products out of the chamber;
- a means for supplying a gaseous oxidizing agent to the chamber, the chamber having a length relative to the conveying speed of the belt such that the food products remain in the chamber for a sufficient duration to kill human pathogens; and
- a means for exhausting the gaseous oxidizing vapor from the chamber at a flow rate relative to the flow rate at which the gaseous oxidizing agent is supplied to the chamber such that a negative pressure is maintained in the chamber;
- a means for providing a curtain of air across the chamber inlet and outlet to (a) prevent gaseous oxidizing agents from escaping to surrounding areas and (b) to prevent humidity and ambient air from entering the chamber through the inlet and outlet.

17. The apparatus as set forth in claim 16, wherein the means for supplying the gaseous oxidizing agent includes:
- a dryer for drying incoming air;
- a vaporizer for vaporizing liquid hydrogen peroxide; and
- a blower for blowing the vaporized hydrogen peroxide into the chamber.

18. The apparatus as set forth in claim 16, further including:
- conduits for conveying the vaporized hydrogen peroxide to a lower portion of the conveyor belt below the belt such that the vaporized hydrogen peroxide is drawn upward through the belt.

19. The apparatus as set forth in claim 16, wherein the food products are almonds and further including:
- a husking machine for removing husks from almonds, the husking machine being disposed upstream from the chamber such that the mesh belt conveys almonds in the shell through the chamber; and
- a deshelling machine disposed downstream from the chamber such that the shelling machine shells the almonds which have passed through the chamber.

20. The apparatus as set forth in claim 19, further including a pathogen barrier which isolates regions upstream of the chamber from regions downstream of the chamber.

21. The apparatus as set forth in claim 16, further including:
- a supply which supplies a single layer of the food products to the mesh belt upstream of the chamber;
- a pathogen impermeable barrier disposed between the supply and downstream regions, the chamber passing through the pathogen barrier.

22. The apparatus as set forth in claim 21, further including:
- packaging machines disposed downstream from the chamber for packaging the food products discharged from the chamber in consumer packages.

23. An apparatus for sanitizing human pathogens from surfaces of almonds, walnuts, or other nuts, the apparatus comprising:
- a means for removing husks from the nuts leaving nuts in their shells;
- a means for moving the nuts in their shells continuously on a mesh belt;
- a means for treating the nuts in their shells while the nuts in their shells are moving on the belt with a gaseous oxidizing agent near atmospheric pressure for a sufficient duration to kill human pathogens such that the shells are sanitized;
- a means for removing the sanitized shells from the nuts leaving nutmeats, after the nuts in their shells were exposed to the gaseous oxidizing agent;
- a means for exposing the nutmeats to a gaseous oxidizing agent after the sanitized shells have been removed for a sufficient duration to kill human pathogens on the nutmeats.

24. An apparatus for sanitizing human pathogens from surfaces of almonds, the apparatus comprising:
- a means for moving in-shell almonds through a microbe impermeable barrier;
- a means for killing microbes on shells of the almonds as the shells move through the microbe impermeable barrier, the microbe impermeable barrier being configured to protect the in-shell almonds which have passed through the microbe impermeable barrier from recontamination by airborne pathogens;
- a means for deshelling the almonds after killing microbes on the shells and separating the shells from nutmeats;
- a means for moving the nutmeats continuously on a mesh belt;
- a means for contacting the nutmeats with a gaseous oxidizing agent while the nutmeats are moving on the belt at near atmospheric pressure for a sufficient duration to kill human pathogens, the contacting of the nutmeats with the gaseous oxidizing agent being formed on all almond nutmeats entering a downstream production region to prevent downstream cross-contamination.

* * * * *